United States Patent [19]
Dinkins

[11] Patent Number: 5,751,693
[45] Date of Patent: *May 12, 1998

[54] CELLULAR DIGITAL SIGNALING

[75] Inventor: Gilbert M. Dinkins, Herndon, Va.

[73] Assignee: Eon Corporation, Reston, Va.

[*] Notice: The term of this patent shall not extend beyond the expiration date of Pat. No. 5,388,101.

[21] Appl. No.: 383,805

[22] Filed: Feb. 3, 1995

Related U.S. Application Data

[63] Continuation-in-part of Ser. No. 966,414, Oct. 26, 1992, Pat. No. 5,388,101.
[51] Int. Cl.⁶ .................. H04Q 7/14; H04Q 7/30; H04Q 7/32
[52] U.S. Cl. .................. 370/95.1; 340/825.44; 455/38.1
[58] Field of Search .................. 340/825.44; 445/32.1, 445/33.1, 38.1, 3.1, 3.2, 4.1, 5.1, 6.1, 13.1; 348/6, 7, 12, 13; 370/95.1, 95.3, 69.1, 71, 73, 75, 76, 124, 85.1, 104.1, 97

[56] References Cited

U.S. PATENT DOCUMENTS

| 5,239,671 | 8/1993 | Linquist et al. | 340/825.44 |
| 5,369,681 | 11/1994 | Boudreau et al. | 340/825.44 |
| 5,392,452 | 2/1995 | Davis | 340/825.44 |

Primary Examiner—Wellington Chin
Attorney, Agent, or Firm—Cushman Darby & Cushman L.L.P.

[57] ABSTRACT

A cellular, digital, two-way messaging system and method. In one embodiment of the present invention, two-way messaging is achieved using pagers, remote receivers, and a central transmitting station. In the present embodiment, the pagers also include displays and keyboards.

35 Claims, 8 Drawing Sheets

CELLULAR DIGITAL SIGNALING

This is a Continuation-In-Part of a application Ser. No. 07/966,414, filed Oct. 26, 1992, by Gilbert M. Dinkins, entitled "Interactive Nationwide Data Service Communication System For Stationary And Mobile Battery Operated Subscriber Units" now U.S. Pat. No. 5,388,101.

TECHNICAL FIELD

This invention relates to communication systems, and, more particularly, to cellular digital communication systems.

BACKGROUND ART

The Federal Communications Commission (FCC) has established communication standards for interactive video data service in the U.S.A. Specifically, the FCC has allocated the 218–219 MHz band for wireless transmissions. Moreover, the FCC has licensed the 218–219 MHz band for public use, in assigned local base station areas, by interactive subscriber units having a maximum effective radiated power of under twenty watts.

A co-pending patent application Ser. No. 07/966,414, filed Oct. 26, 1992, by Gilbert M. Dinkins, entitled "Interactive Nationwide Data Service Communication System For Stationary And Mobile Battery Operated Subscriber units", now U.S. Pat. No. 5,388,101 discloses a two-way interactive communication network operating at the 218–219 MHz band. The co-pending Dinkins Application is herein incorporated by reference. The system disclosed in that application includes a network switching center, and provides point-to-point communications between subscriber units at different geographic locations. The network switching center, or hub, is connected via satellite links to a plurality of local CTSs. The local CTSs communicate over an rf link with a number of low-power subscriber units. The low-power subscriber units are, for example, battery-powered mobile units. The subscriber units for this system are each located in the vicinity of a CTS. The subscriber units are adapted for synchronous time-division-duplexed receipt and transmission of digital messages. The digital messages are transmitted to and from the subscriber units through different paths.

When transmitting digital messages to a subscriber unit from a CTS, the digital messages are transmitted at relatively high power (in the tens of watts range) from a local CTS to the subscriber unit. The subscriber unit is, typically, an inexpensive, low-power, mobile, small-sized, device. Digital messages are transmitted from these low-power subscriber units at relatively low power (in the milliwatt range) to the CTS using an intermediate set of remote receiver units. The low-power subscriber units transmit at milliwatt power levels, and the system incorporating such low-power, milliwatt subscriber units is called a Milliwatt System.

This Milliwatt System permits live video programs viewed nationwide, such as world series baseball games, to become interactive for individual subscriber participation. Thus, mass communication over a substantially real time communication system is made possible. Furthermore, such real time mass communication is made feasible even with large urban area audience participation. Thus, the Milliwatt System enables real time mass communication even under conditions which would jam existing public telephone switching networks.

In the paging arts, modems are used for connection with a telephone system for communication and switching over a national network. A description of such paging systems is set forth in U.S. Pat. Nos. 4,870,410 and 4,875,039 to Andros et al. However, the paging systems described in the Andros et al. patents are still subject to switching bottlenecks associated with the prior art. Additionally, any switching bottlenecks found in the prior art would be further compounded in two-way paging applications. Furthermore, switching bottlenecks occur with the Andros et al. system even when short digital-only communication is employed. Thus, the Andros et al. system is not well suited to transmitting longer digital messages such as, for example, digital encoded text messages.

Thus, the need exists for a digital communication system which is suitable for two-way paging, is able to accommodate transmission of text messages, which can operate without extensive delay even during heavy usage, and which can be employed with an interactive data broadcast network.

DISCLOSURE OF THE INVENTION

It is, therefore, an object of the present invention to provide a digital communication system which is suitable for two-way paging, is able to accommodate transmission of text messages, which can operate without extensive delay even during heavy usage, and which can be employed with a cellular, digital, two-way messaging system and method. This object has been achieved with a digital, cellular two-way messaging system employing pagers, remote receivers, and a central transmitting station.

In one embodiment of the present invention, a messaging unit, such as, for example, a pager transmits a message, i.e. data signals, via a remote receiver to a CTS. The CTS then transmits the message to a selected pager. If desired, the selected pager can respond by transmitting a message via the same or a different remote receiver back to CTS. The CTS then transmits the message directly to the original pager. In so doing, the present invention provides for two-way digital paging.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
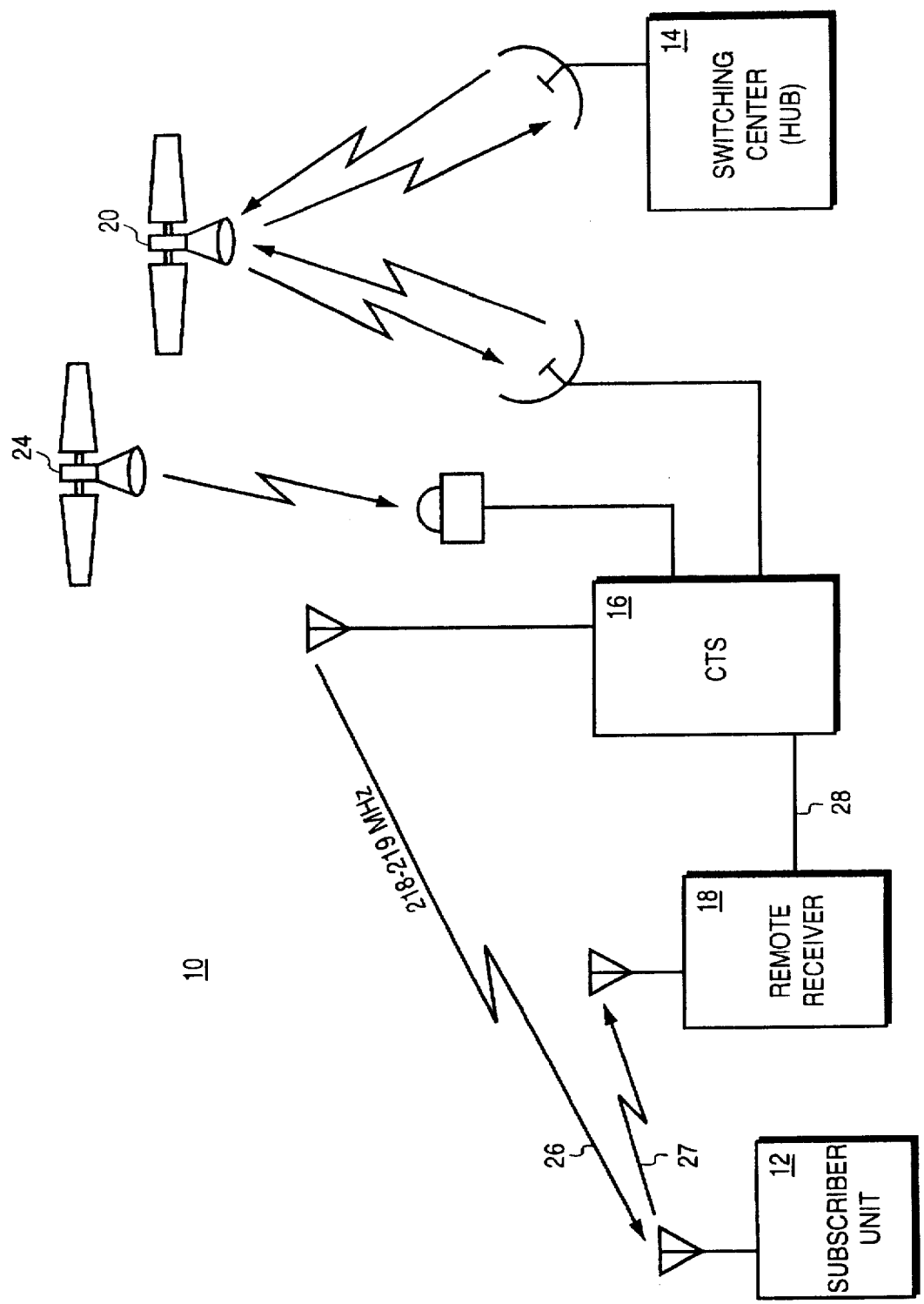
FIG. 1 is a block diagram of an interactive data broadcast system which provides point-to-point communications between subscriber units in local service areas and a national hub.

With reference next to FIG. 1, a block diagram of the Milliwatt interactive broadcast data system 10 is shown. This system 10 provides point-to-point communications between a number of subscriber units, typically shown as 12, and a national switching center, or hub, 14. The subscriber units 12 may be stationary units or mobile units. The system 10 includes a number of geographically distributed CTSs 16 each having at least one adjacently located remote receiver unit, typically shown as 18. The CTS 16 has two-way communication with the switching center 14 via two-way satellite links to a satellite 20. The CTS 16 includes data processing, switching, and transmitting capabilities.

With reference still to FIG. 1, information is transmitted to and from a subscriber unit 12 using two different signal paths. In the present embodiment, the CTS 16 transmits information to subscriber unit 12 using a 218–219 MHz rf link 26. Subscriber unit 12 transmits information back to CTS 16 via a remote receiver unit 18. Subscriber unit 12 transmits information to remote receiver unit 18 using another 218–219 MHz rf link 27. The power level of the transmitter of subscriber unit 12 is in the milliwatt range. Remote receiver unit 18 then transmits the information to CTS 16 using, for example, a hard-wired data link 28. CTS 16 then communicates the information received from subscriber unit 12 to switching center 14 via satellite 20. Although communication links 26 and 27 are 218–219 MHz rf links in the present embodiment, the present invention is also well suited to using various other types of links such as, for example, hardwire links, or to using other frequencies.

A co-pending patent application Ser. No. 07/966,414, filed Oct. 26, 1992, by G. Dinkins, entitled "Interactive Nationwide Data Service Communication System For Stationary And Mobile Battery Operated Subscriber units" is incorporated herein by reference. The Dinkins reference discloses in detail a two-way interactive video communication network which uses subscriber units having milliwatt transmitter output power. The basic operation of this type of video interactive system is set forth in U.S. Pat. Nos. 4,591,906 and 5,101,267. Details of point-to-point switching and communication throughout the system identified at switching and control center 14 and an accompanying terminal directory, downloading of data and software from the control center, the processing of billings and transactions, and the corresponding interaction of the memory and software at the subscriber unit 12 are set forth in co-pending applications Ser. No. 07/889,626, May 28, 1992 entitled "Software Controlled Interactive Video Network" and Ser. No. 07/932,241, Aug. 19, 1992 entitled "Interactive Satellite Broadcast Network", which are also incorporated herein by reference as background material.

Figure 2:
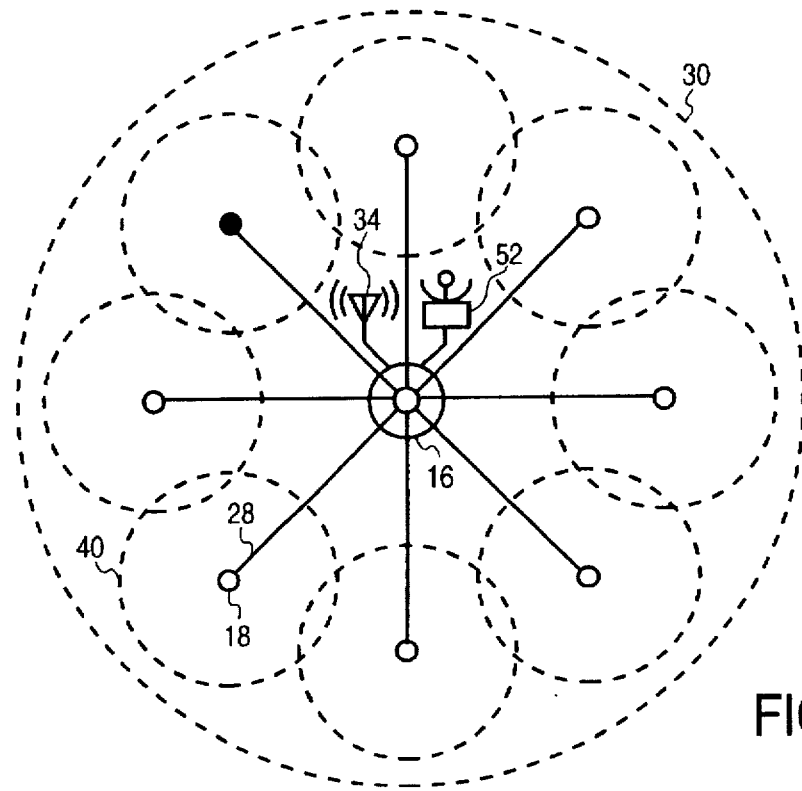
FIG. 2 is a diagram showing the location of remote receivers around a central transmitting station.

With reference next to FIG. 2, an area 30 served by a central transmitting station 16 is diagrammatically shown. Dotted ring 30 outlines the limits of a local CTS 16, such as may be licensed by the FCC for interactive broadcast data service. The CTS 16 communicates with the satellite system via directed dish antenna 32, and transmits digital communication signals and broadcast signals to a set of subscriber units, not shown, throughout the assigned territory within the dotted boundary rings 40 by way of an antenna 34.

With reference again to FIG. 2, at least one remote receiver 18 is positioned at a strategic location within the CTS cell area defined by ring 30. Each remote receiver 18 is connected by, for example, cable, rf link, or leased telephone line 28 to CTS 16. Thus, subscriber units located within a subdivided response zone 40 communicate with remote receiver 18 over a significantly reduced transmission path distance within the subdivided response zones 40, as compared with direct transmission to CTS 16. This subdivision feature provides for reliable transmission in an interactive broadcast data system at radiated power levels in the milliwatt region.

Figure 3:
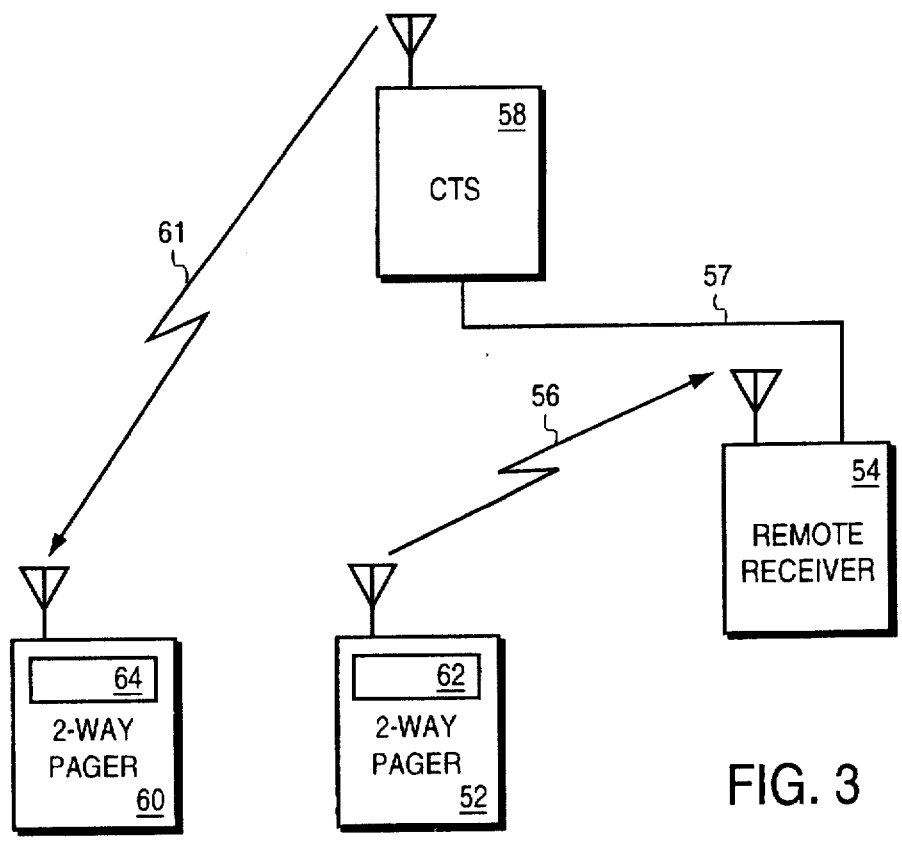
FIG. 3 is a schematic diagram of one embodiment of a two-way paging system in accordance with the present invention.

With reference next to FIG. 3, a schematic diagram of one embodiment of a two-way paging system according to the present invention is shown. In the present embodiment, a messaging unit 52 is adapted to communicate with a remote receiver 54 over an rf link 56. In the present embodiment, messaging unit 52 is a two-way pager. Remote receiver 54 is connected by cable 57 to CTS 58. Although a cable 57 is used to link remote receiver 54 and CTS 58 in the present embodiment, the present invention is also well suited to other types of communication links such as, for example, an rf link or a leased telephone line. CTS 58 is able to communicate with pager 60 via an rf link 62. In the present embodiment, communication links 56 and 62 are 218–219 MHz rf links. Although such links are used in the present embodiment, the present invention is also well suited to using various other types of links such as, for example, hardwire links, or to using other frequencies.

In operation, pager 52 transmits a message, data signals, via remote receiver 54 to CTS 58. CTS 58 then transmits the message to pager 60. If desired, pager 60 can respond by transmitting a message via another remote receiver, not shown, to CTS 58. CTS 58 then transmits the message directly to pager 52. Thus, the present invention provides for two-way digital paging. Although pager 60 responds via another remote receiver in the present embodiment, the present invention is also well suited to having pager 60 respond by transmitting a message via the same remote receiver 54. That is, if pagers 60 and 52 are in the same geographic region served by a common remote receiver, such as region 40 of FIG. 2, then pagers 60 and 52 would both communicate with CTS 58 via remote receiver 54.

In the embodiment of FIG. 3, upon receiving data signals from pager 52, CTS 58 will attempt to locate pager 60. If CTS 58 is unable to locate pager 60 after a selected number of attempts, CTS 58 will forward the data signals to the network hub, not shown, for temporary storage. After a predetermined period of time, CTS 58 will again attempt to transmit the data signals to pager 60. Furthermore, although pager 52 directs data signals to only pager 60 in the present embodiment, the present invention is also well suited having pager 52 concurrently direct data signals to a plurality of a pagers.

With reference still to FIG. 3, pagers 52 and 60 include display screens 62 and 64, respectively. Display screens 62 and 64 are used, for example, to display the identification number of the pager from which a message originated, to display a text message, or for any other suitable display purpose. Although such displays are employed in the present embodiment, the present invention is also well suited to using pagers which do not have displays.

Figure 4:
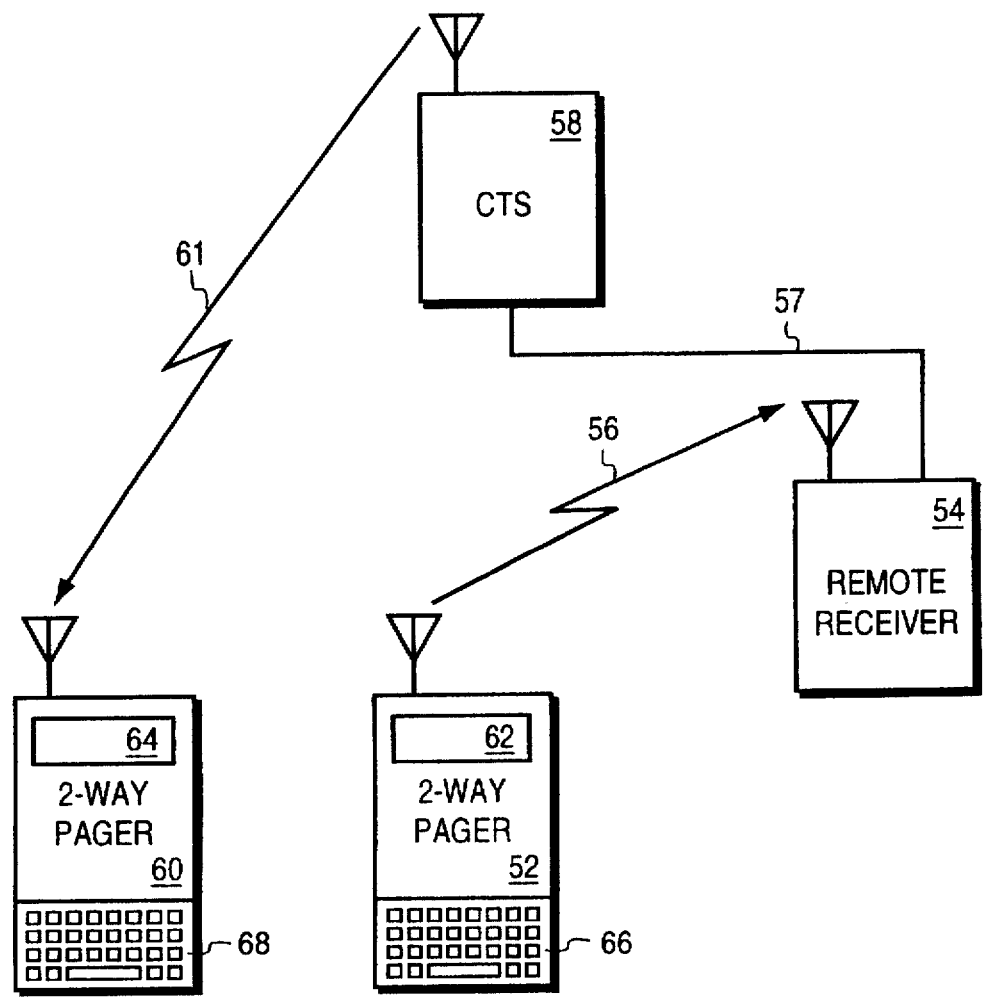
FIG. 4 is a schematic diagram of another embodiment of the two-way paging system of FIG. 3 including data entry keyboards formed integrally with the pagers in accordance with the present invention.

With reference next to FIG. 4, another embodiment of the present invention is shown in which pagers 52 and 60 include data entry keyboards 66 and 68, respectively. In the present embodiment, data entry keyboards 66 and 68 are built into pagers 52 and 60, respectively.

Figure 5:
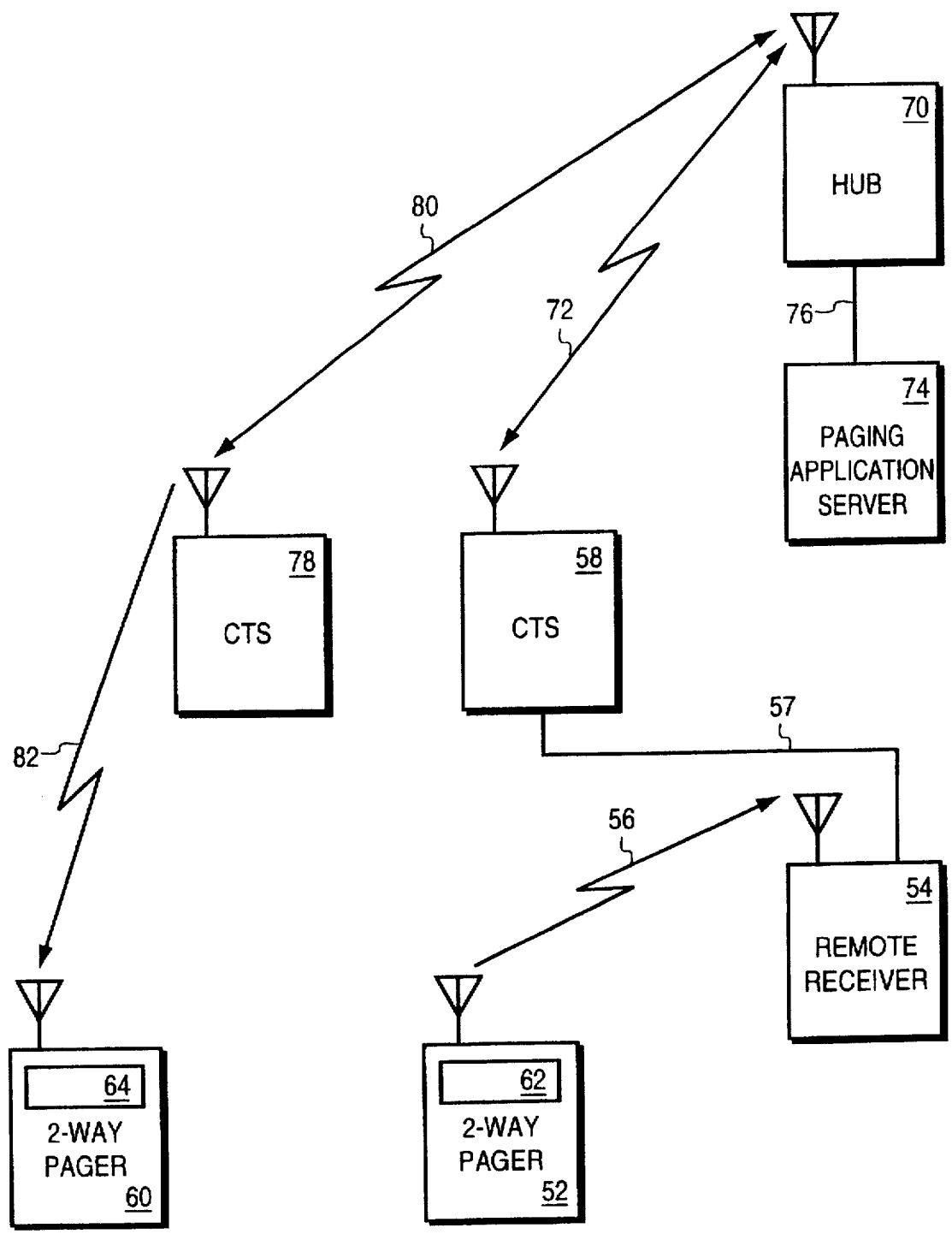
FIG. 5 is a schematic diagram of another embodiment of a two-way paging system including a network switching hub and a two-way paging application server in accordance with the present invention.

With reference next to FIG. 5, a schematic diagram of another embodiment of a two-way paging system according to the present invention is shown. In the present embodiment, a messaging unit 52 is adapted to communicate with a remote receiver 54 over an rf link 56. In the present embodiment, messaging unit 52 is a pager. Remote receiver 54 is connected by cable 57 to CTS 58. As in the previous embodiment, the present invention is also well suited to other types of communication links such as, for example, an rf link or a leased telephone line.

In the present embodiment, CTS 58 is communicatively coupled to a network switching hub 70 via rf link 72. Network switching hub 70, in turn, is linked to a paging application server 74 via link 76. As shown in FIG. 5, network hub 70 is also coupled to CTS 78 via rf link 80. CTS 78 is linked to pager 60 via rf link 82. In the present embodiment, communication links 56, 72, 80 and 82 are 218–219 MHz rf links. Although such links are used in the present embodiment, the present invention is also well suited to using various other types of links such as, for example, hardwire links, or to using other frequencies. Likewise, the present invention is also well suited to using various types of links such as, for example, hardwire links, or to using rf frequencies to link network hub 70 and paging application server 74.

In operation, pager 52 transmits a message, data signals, via remote receiver 54 to CTS 58 in a manner similar to the previous embodiment. CTS 58 then transmits the message over link 72 to network hub 70. Network hub 70 then transmits the message over to paging application server 74. Paging application server is then able to provide the necessary information to direct network hub 70 to direct the data signals to the proper CTS 78 associated with pager 60. If desired, pager 60 can respond by transmitting a message via another remote receiver, not shown, to CTS 58 back through network hub 70, paging application server 74, and CTS 58 to pager 52. Thus, the present invention provides for two-way digital paging. Furthermore, although pager 52 directs data signals to only pager 60 in the present embodiment, the present invention is also well suited having pager 52 concurrently direct data signals to a plurality of a pagers.

With reference still to FIG. 5, as in the previous embodiment, pagers 52 and 60 include display screens 62 and 64, respectively. Display screens 62 and 64 are used, for example, to display the identification number of the pager from which a message originated, to display a text message, or for any other suitable display purpose. Although such displays are employed in the present embodiment, the present invention is also well suited to using pagers which do not have displays.

Figure 6:
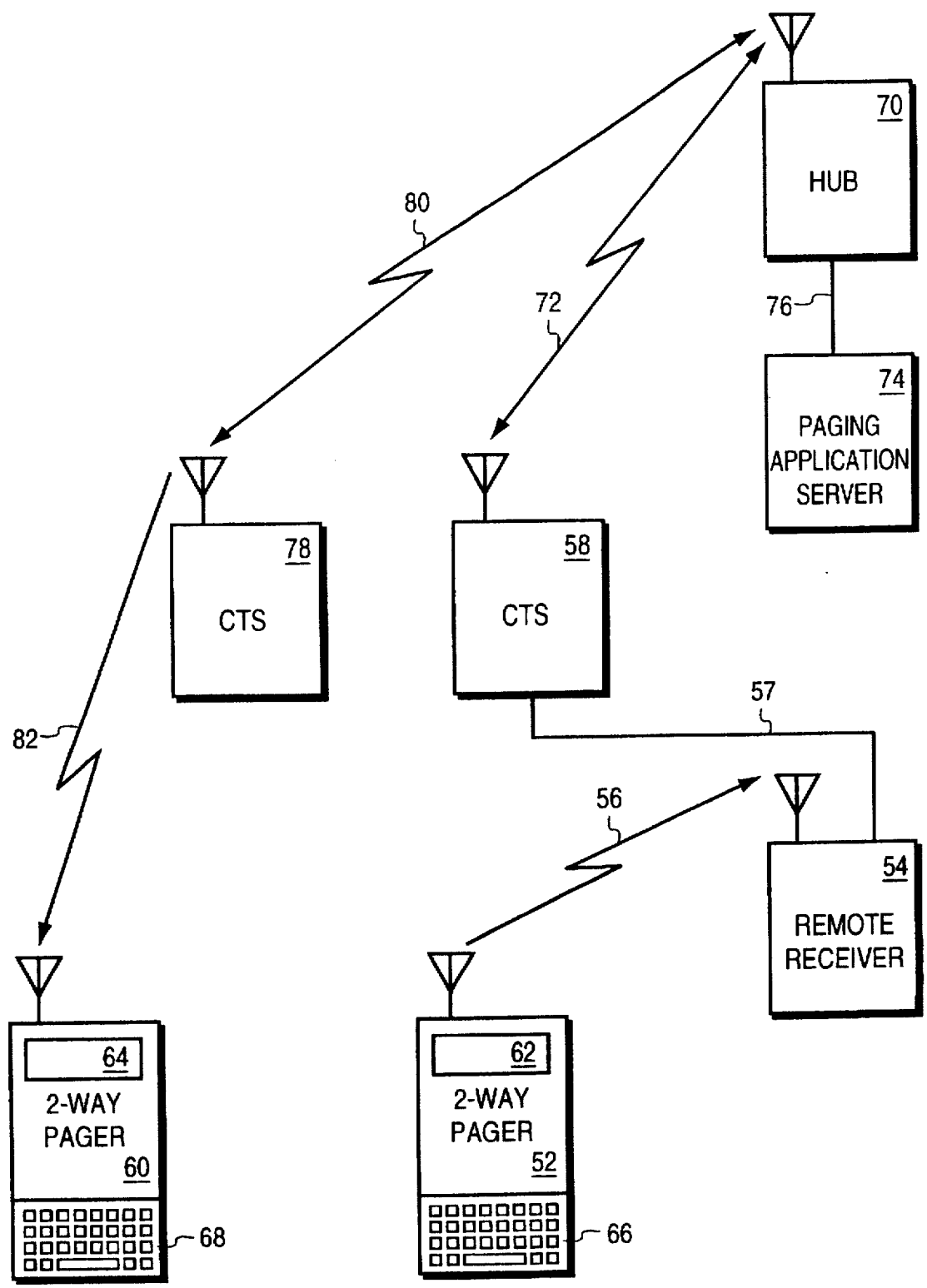
FIG. 6 is a schematic diagram of another embodiment of the two-way paging system of FIG. 5 including data entry keyboards formed integrally with the pagers in accordance with the present invention.

With reference next to FIG. 6, another embodiment of the present invention is shown in which pagers 52 and 60 include data entry keyboards 66 and 68, respectively. In the present embodiment, data entry keyboards 66 and 68 are built into pagers 52 and 60, respectively.

Figure 7:
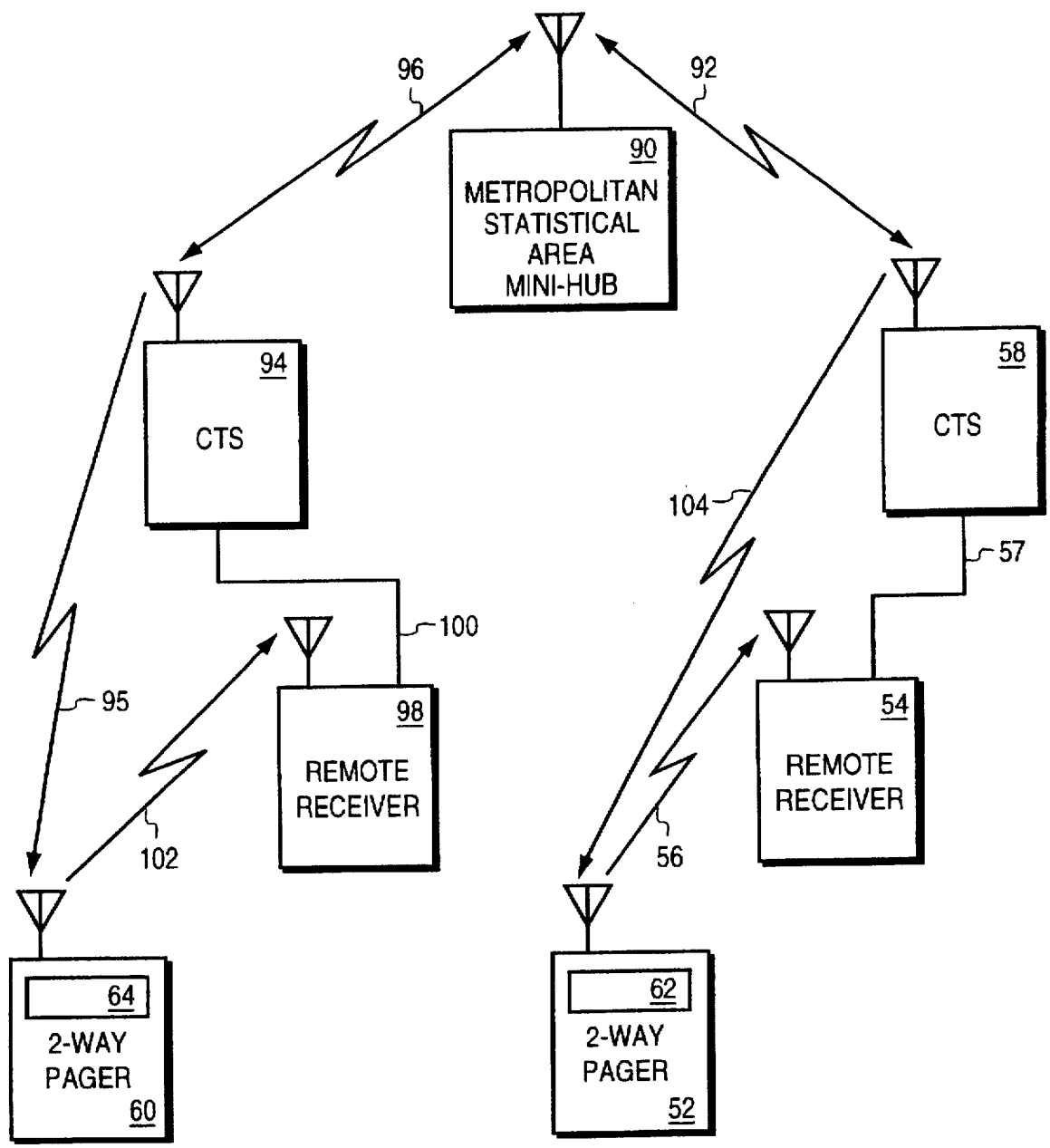
FIG. 7 is a schematic diagram of another embodiment of a two-way paging system including a network switching hub and a paging application server in accordance with the present invention.

With reference next to FIG. 7 a schematic diagram of another embodiment of a two-way paging system according to the present invention is shown. In the present embodiment, a messaging unit 52 is adapted to communicate with a remote receiver 54 over an rf link 56. In the present embodiment, messaging unit 52 is a pager. Remote receiver 54 is connected by cable 57 to CTS 58. As in the previous embodiments, the present invention is also well suited to other types of communication links such as, for example, an rf link or a leased telephone line.

In the present embodiment, CTS 58 is communicatively coupled to a metropolitan statistical area mini-hub 90 via rf link 92. Metropolitan statistical area mini-hub 90, in turn, is linked to a second CTS 94 via rf link 96. CTS 94 is linked to pager 60 via rf link 95. In the present embodiment, communication links 56, 92, 95, 96, 102, and 104 are 218–219 MHz rf links. Although such links are used in the present embodiment, the present invention is also well suited to using various other types of links such as, for example, hardwire links, or to using other frequencies. Metropolitan statistical area mini-hub 90 serves as a pseudo-network hub for multiple CTSs which are located within a specified geographic area. An example of a specified geographic area might be, for example, a single city.

In operation, pager 52 transmits a message, data signals, via remote receiver 54 to CTS 58 in a manner similar to the previous embodiments. CTS 58 then transmits the message over link 92 to metropolitan statistical area mini-hub 90. Metropolitan statistical area mini-hub 90 then transmits the message over rf link 96 to the proper CTS 94 associated with pager 60. If desired, pager 60 can respond by transmitting a message via link 102, another remote receiver 98, and link 100 to CTS 94. CTS 94 then transmits the message back to metropolitan statistical area mini-hub 90, and on to CTS 58. CTS 58 transmits the response message to pager 52. Thus, the present invention provides for two-way digital paging. Furthermore, although pager 52 directs data signals to only pager 60 in the present embodiment, the present invention is also well suited having pager 52 concurrently direct data signals to a plurality of a pagers.

With reference still to FIG. 7, as in the previous embodiment, pagers 52 and 60 include display screens 62 and 64, respectively. Display screens 62 and 64 are used, for example, to display the identification number of the pager from which a message originated, to display a text message, or for any other suitable display purpose. Although such displays are employed in the present embodiment, the present invention is also well suited to using pagers which do not have displays.

Figure 8:
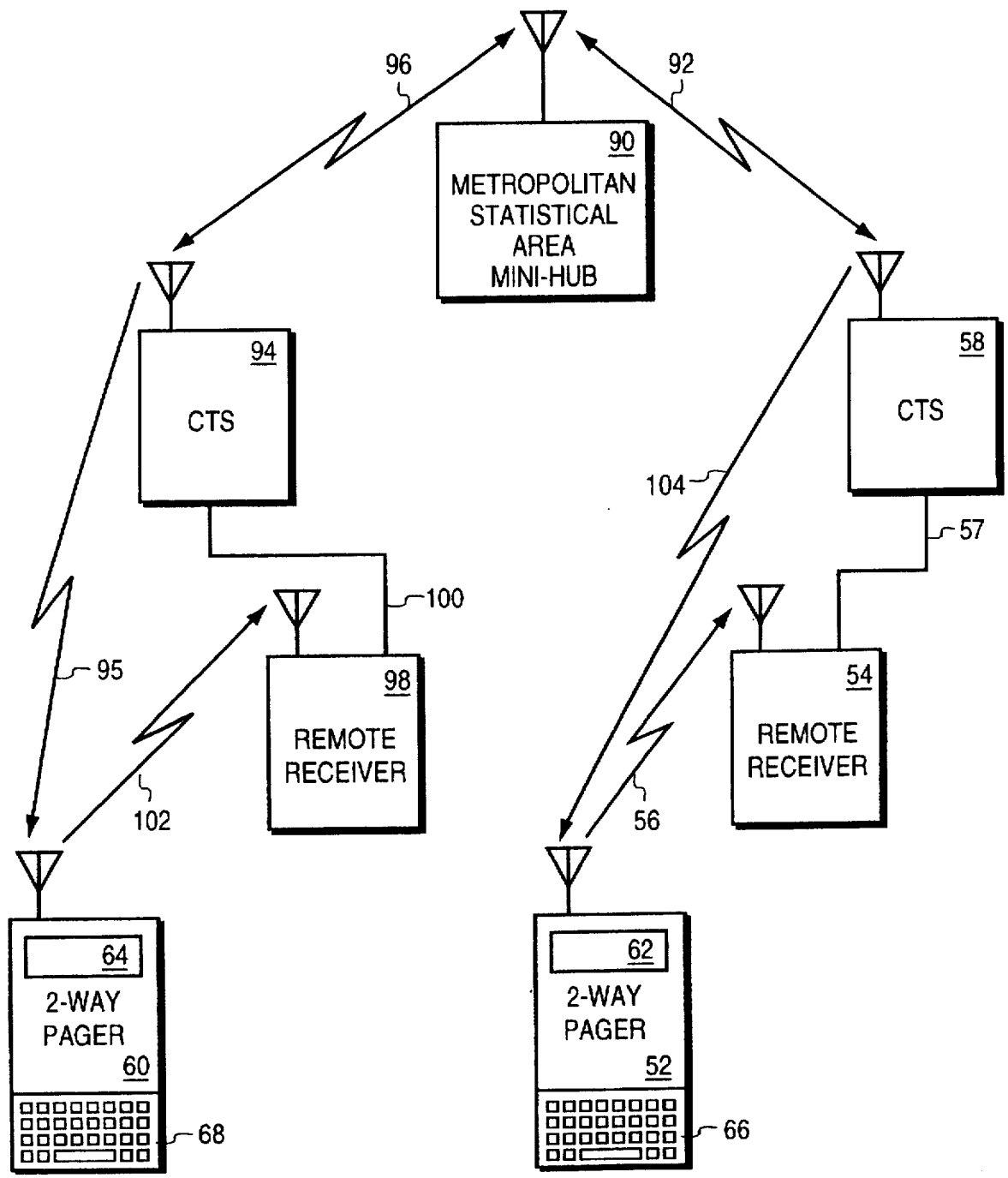
FIG. 8 is a schematic diagram of another embodiment of the two-way paging system of FIG. 7 including data entry keyboards formed integrally with the pagers in accordance with the present invention.

With reference next to FIG. 8, another embodiment of the present invention is shown in which pagers 52 and 60 include data entry keyboards 66 and 68, respectively. In the present embodiment, data entry keyboards 66 and 68 are built into pagers 52 and 60, respectively.

Figure 9:
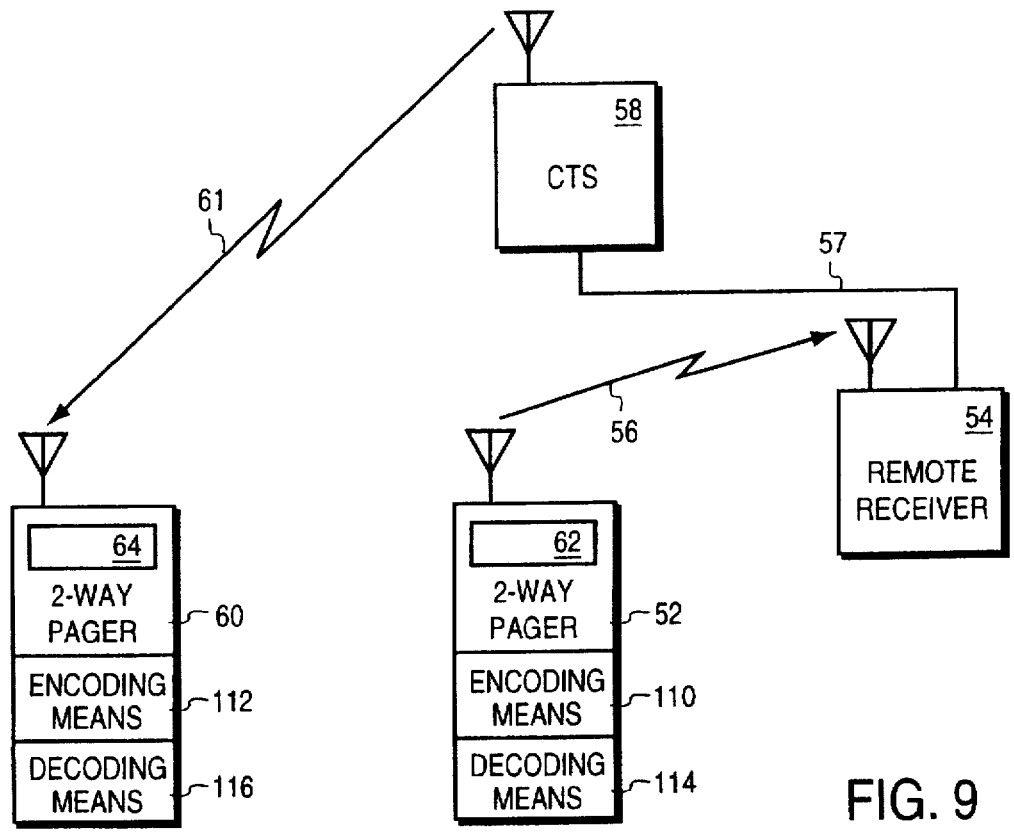
FIG. 9 is a schematic diagram of another embodiment of a two-way communication system suitable for transmitting text including encoding and decoding means in accordance with the present invention.

With reference next to FIG. 9, yet another embodiment of the present invention is shown in which pagers 52 and 60 include text encoding means 110 and 112, respectively. Encoding means 110 and 112 are, for example, scanners and the like for encoding text material into a format suitable for transmission over links such as 56, 57, and 62. Pagers 52 and 60 also include text decoding means 114 and 116, respectively. Decoding means 114 and 116 decode the encoded data to back to a format suitable for display on displays 62 and 64. Thus, the present invention also provides a cellular digital two-way communication system suitable for transmitting encoded text.

Figure 10:
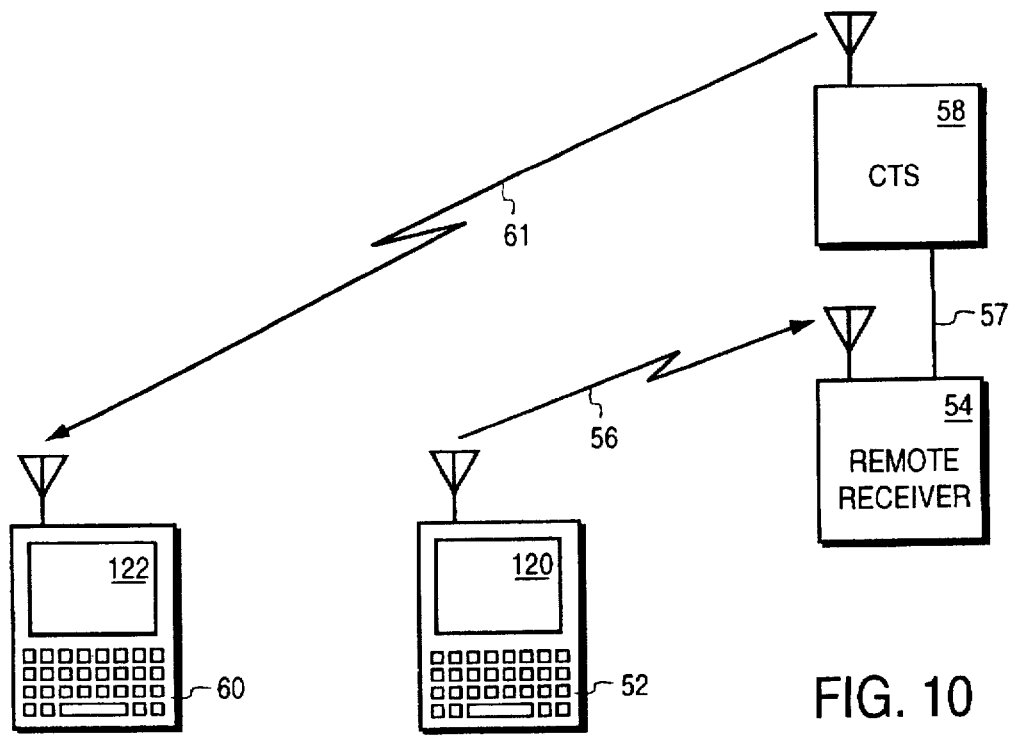
FIG. 10 is a schematic diagram of another embodiment of a two-way communication system including "ink-based" data entry and display screens in accordance with the present invention.

Referring now to FIG. 10, still another embodiment of a two-way messaging system having "ink-based" data entry and display screens 120 and 122. Two-way pagers 52 and 60 have ink-based data entry and display screens 120 and 122, respectively, formed integrally therein. In operation, a user of pager 52 uses a stylus, not shown, or other similar writing instrument to write or draw a message onto data entry and display screen 120. Pager 52 transmits the message via link 56 to remote receiver 54. The message is then passed over link 57 to CTS 58. CTS 58 tranmsits the message to pager 60. The message is then displayed on display screen 122. In the present embodiment, the written message or drawing which appears on screen 122 is essentially a duplicate of the message entered onto screen 120.

With reference still to FIG. 10, a user of pager 60 can also respond by writing or drawing a message onto screen 122 and transmitting the message over a path similar to the path used by pager 52. Additionally, the present embodiment is also well suited to using a metropolitan statistical area mini-hub, a network switching hub, or a two-way paging application server as described above.

Thus, the present invention provides a digital communication system which is suitable for two-way paging, is able to accommodate transmission of text messages, which can operate without extensive delay even during heavy usage, and which can be employed with an interactive data broadcast network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A two-way paging apparatus comprising:

a central transmitting station, at least one remote receiver communicatively coupled to said central transmitting station, said at least one remote receiver disposed within a first geographic area associated with said central transmitting station, said at least one remote receiver adapted to synchronously communicate with said central transmitting station, at least one pager communicatively coupled to said central transmitting station and said at least one remote receiver, said at least one pager adapted to synchronously communicate with said central transmitting station and said at least one remote receiver, said at least one pager disposed within a second geographic area associated with said at least one remote receiver.

2. The two-way paging apparatus of claim 1 wherein said at least one pager has a maximum power output in the milliwatt range.

3. The two-way paging apparatus of claim 1 wherein said at least one pager is a low power, battery powered unit.

4. The two-way paging apparatus of claim 1 wherein said at least one pager is a mobile unit.

5. The two-way paging apparatus of claim 1 wherein said at least one pager is communicatively coupled to said central transmitting station via an rf link.

6. The two-way paging apparatus of claim 5 wherein said at least one pager is communicatively coupled to said central transmitting station via a 218–219 MHz rf link.

7. The two-way paging apparatus of claim 1 further including:

a network switching hub communicatively coupled to said central transmitting station, and at least one second central transmitting station communicatively coupled to said network switching hub, said at least one second central transmitting station having a second at least one pager communicatively coupled thereto.

8. The two-way paging apparatus of claim 7 further including a paging application server communicatively coupled to said network switching hub.

9. The two-way paging apparatus of claim 1 further including a metropolitan statistical area mini-hub communicatively coupled to said central transmitting station and to at least one second central transmitting station.

10. The two-way paging apparatus of claim 1 wherein said at least one pager further includes an integral data entry keyboard.

11. A two-way paging system comprising:

at least one pager, central transmitting station means for communicating with said at least one pager, said central transmitting station means and said at least one pager disposed in a first geographic area, said central transmitting station means further comprising, data processing and transmission means for transmitting to and receiving from said at least one pager multiplexed synchronously related data messages of variable lengths, such that point-to-point communication between said central transmitting station means and said at least one pager is possible, reception means for receiving and processing said multiplexed synchronously related data messages from said at least one pager and relaying said multiplexed synchronously related data messages to said central transmitting station means.

12. The two-way paging system of claim 11 wherein said point-to-point communication between said central transmitting station means and said at least one pager is accomplished via digital data modulated on an rf carrier.

13. The two-way paging system of claim 12 wherein said point-to-point communication between said central transmitting station means and said at least one pager is accomplished via digital data modulated on an rf carrier frequency of approximately 218–219 MHz.

14. The two-way paging system of claim 11 wherein said at least one subscriber unit is further includes an integral data entry keyboard.

15. The two-way paging system of claim 11 wherein said reception means further comprises:

at least one remote receiver disposed within a respective at least one central transmitting station means subdivision site wherein said at least one cell subdivision site is partitioned from said first geographic area associated with said central transmitting station means, said at least one remote receiver adapted for receiving low power digital messages transmitted from said at least one pager located within range of said at least one remote receiver and for relaying said low power digital messages to said central transmitting station means.

16. A two-way messaging method for communicating between messaging units comprising the steps of:

transmitting data signals from a first at least one messaging unit to a remote receiver synchronously related to said central transmitting station, said remote receiver located in a first geographic region associated with said central transmitting station, relaying said data signals from said remote receiver to said central transmitting station, and transferring said data signals from said central transmitting station to a second at least one messaging unit.

17. The two-way messaging method as recited in claim 16 further including the steps of:

transferring said data signals from said central transmitting station to a network switching hub, relaying said data signals from said network switching hub to a messaging application server, transmitting said data signals from said messaging application server back to said network switching hub, and transferring said data signals from said network switching hub to said central transmitting station before transmitting said signals from said central transmitting station to said second at least one messaging unit.

18. The two-way messaging method as recited in claim 16 further including the steps of:

transferring said data signals from said central transmitting station to a metropolitan statistical area mini-hub, transmitting said data signals from said metropolitan statistical area mini-hub to a second central transmitting station located in a second geographic region associated therewith, transmitting said data signals from said second central transmitting station to said at least one second pager located in said second geographic region associated with said second central transmitting station, said at least one second pager synchronously related to said second central transmitting station.

19. The two-way messaging method as recited in claim 16 wherein said step of transmitting data signals from a first at least one messaging unit to a remote receiver further includes transmitting rf signals having a frequency of approximately 218-219 MHz from said first at least one messaging unit to said remote receiver.

20. The two-way messaging method as recited in claim 16 wherein said step of transferring said data signals from said central transmitting station to a second at least one messaging unit further includes transmitting rf signals having a frequency of approximately 218-219 MHz from said central transmitting station to said second at least one messaging unit.

21. The two-way messaging method as recited in claim 16 wherein said step of transmitting data signals from a first at least one messaging unit to a remote receiver further includes transmitting said data signals to said remote receiver using a maximum power output in the milliwatt range.

22. A two-way messaging system comprising:

at least one messaging unit having a data entry keyboard integral therewith, central transmitting station means for communicating with said at least one messaging unit, said central transmitting station means and said at least one messaging unit disposed in a first geographic area, said central transmitting station means further comprising, data processing and transmission means for transmitting to and receiving from said at least one messaging unit multiplexed synchronously related data messages of variable lengths, such that point-to-point communication between said central transmitting station means and said at least one messaging unit is possible, reception means for receiving and processing said multiplexed synchronously related data messages from said at least one messaging unit and relaying said multiplexed synchronously related data messages to said central transmitting station means.

23. The two-way messaging system of claim 22 wherein said point-to-point communication between said central transmitting station means and said at least one messaging unit is accomplished via digital data modulated on an rf carrier.

24. The two-way messaging system of claim 23 wherein said point-to-point communication between said central transmitting station means and said at least one messaging unit is accomplished via digital data modulated on an rf carrier frequency of approximately 218-219 MHz.

25. The two-way messaging system of claim 22 wherein said at least one messaging unit is further comprised of:

a low power mobile unit located within said first geographic area, said low power mobile unit adapted to communicate with said central transmitting station means by way of digital data signals of variable lengths synchronously related and timed for multiplexed message transmission with said central transmitting station means.

26. The two-way messaging system of claim 22 wherein said reception means further comprises:

at least one remote receiver disposed within a respective at least one central transmitting station means subdivision site wherein said at least one cell subdivision site is partitioned from said first geographic area associated with said central transmitting station means, said at least one remote receiver adapted for receiving low power digital messages transmitted from said at least one messaging unit located within range of said at least one remote receiver and for relaying said low power digital messages to said central transmitting station means.

27. A two-way digital communication system comprising:

at least one receiver including decoding means for receiving and decoding encoded text, central transmitting station means for communicating with said at least one receiver, said central transmitting station means and said at least one receiver disposed in a first geographic area, said central transmitting station means further comprising, data processing and transmission means for transmitting to and receiving from said at least one receiver multiplexed synchronously related data messages of variable lengths, such that point-to-point communication between said central transmitting station means and said at least one receiver is possible, reception means for receiving and processing said multiplexed synchronously related data messages from said at least one receiver and relaying said multiplexed synchronously related data messages to said central transmitting station means.

28. The two-way digital communication system of claim 27 wherein said point-to-point communication between said central transmitting station means and said at least one receiver is accomplished via digital data modulated on an rf carrier.

29. The two-way digital communication system of claim 28 wherein said point-to-point communication between said central transmitting station means and said at least one receiver is accomplished via digital data modulated on an rf carrier frequency of approximately 218–219 MHz.

30. The two-way digital communication system of claim 27 wherein said at least one receiver further includes an integral data entry keyboard.

31. The two-way digital communication system of claim 27 wherein said reception means further comprises:
  at least one remote receiver disposed within a respective at least one central transmitting station means subdivision site wherein said at least one cell subdivision site is partitioned from said first geographic area associated with said central transmitting station means, said at least one remote receiver adapted for receiving low power digital messages transmitted from said at least one receiver located within range of said at least one remote receiver and for relaying said low power digital messages to said central transmitting station means.

32. The two-way digital communication system of claim 27 further including encoding means for digitally encoding text such that said encoded text can be transmitted to said at least one receiver.

33. The two-way digital communication system of claim 27 wherein said at least one receiver further includes display means for displaying said decoded text.

34. The two-way digital communication system of claim 27 wherein said at least one receiver further includes a data entry and display screen.

35. The two-way digital communication system of claim 34 wherein said text is handwritten text entered onto said data entry and display screen.

\* \* \* \* \*